United States Patent [19]

Gora

[11] Patent Number: 4,982,614

[45] Date of Patent: Jan. 8, 1991

[54] PROCESS OF TAKING LIQUID FROM LARGE-VOLUME, DEEP VESSELS BY MEANS OF SUCKING VESSELS AND AUXILIARY SUCKING DEVICE FOR USE WITH LARGE-VOLUME, DEEP VESSELS IN CARRYING OUT THAT PROCESS

[75] Inventor: Heinz-Jürgen Gora, Hamburg, Fed. Rep. of Germany

[73] Assignee: Eppendorf-Netheler-Hinz GmbH, Hamburg, Fed. Rep. of Germany

[21] Appl. No.: 358,444

[22] Filed: May 26, 1989

[30] Foreign Application Priority Data

May 28, 1988 [DE] Fed. Rep. of Germany ....... 3818238

[51] Int. Cl.$^5$ .............................................. G01N 1/00

[52] U.S. Cl. .................................................. 73/863.81

[58] Field of Search ........... 73/863.71, 863.81, 863.83, 73/863.85, 863.86, 864, 864.01, 864.13, 864.14, 864.16, 864.34, 864.51, 864.63; 422/100

[56] References Cited

U.S. PATENT DOCUMENTS 3,273,402 9/1966 Farr ................................ 73/864.16

FOREIGN PATENT DOCUMENTS 1171180 5/1964 Fed. Rep. of Germany ... 73/863.81

0113040 5/1987 Japan ............................... 73/863.83

0720161 12/1954 United Kingdom ............ 73/863.31

*Primary Examiner*—Robert Raevis

*Attorney, Agent, or Firm*—Toren, McGeady & Associates

[57] ABSTRACT

For the taking of liquid from large-volume, deep vessels by means of sucking vessels having short suction elements, a metered stand-by volume of liquid, which is accessible from above, is sucked from a volume of liquid of changing depth in the deep vessel and a defined sample of liquid is sucked from said stand-by volume at the same time. The auxiliary sucking device comprises a tube, which is adapted to be introduced into the deep vessel, and a check valve, which prevents a flow to the open bottom end of the tube. The tube is mounted on a bowl, which is adapted to be placed on the mouth of the deep vessel. The bowl preferably constitutes a portion of a housing in which the open top end of the tube is disposed close to the top wall of the housing. The top portion of the bowl contains an entrance opening, which is disposed above the stand-by volume of liquid, at least part of which is contained in the bowl. The entrance opening is adapted to receive the tip of a sample-taking vessel, which is provided with a piston. During the taking of each sample, a stand-by volume of liquid having a defined depth is provided in the housing.

9 Claims, 3 Drawing Sheets

PROCESS OF TAKING LIQUID FROM LARGE-VOLUME, DEEP VESSELS BY MEANS OF SUCKING VESSELS AND AUXILIARY SUCKING DEVICE FOR USE WITH LARGE-VOLUME, DEEP VESSELS IN CARRYING OUT THAT PROCESS

BACKGROUND OF THE INVENTION

1. Field of the Invention

This invention relates to a process of taking liquid from large-volume, deep vessels by means of sucking vessels having sucking elements which are short relative to the depth of the deep vessels, wherein liquid is sucked from a liquid volume which is contained in said deep vessel and has a changing depth.

This invention relates also to an auxiliary sucking device for use with large-volume, deep vessels in carrying out the process, comprising a tube, which is adapted to be introduced into the deep vessel, and a check valve, which is associated with the flow area of the tube and prevents a downward flow in the tube, and a bowl, which is detachably mounted on the deep vessel and contains a mouth adjacent to the top end of the tube that is provided with the check valve.

2. Description of the Prior Art

German Patent Specification No. 29 26 691 discloses a repeat pipette, which is to be connected to a syringe-like vessel, which comprises a cylinder body and at one end a conical tip.

A piston is reciprocable in the cylinder body so that liquid can be sucked in that the piston is retracted and can be discharged in that the piston is advanced. To reduce the air volume the piston is suitably provided with a conical extension, which protrudes into the conical tip. The conical tip has a predetermined length and a predetermined external shape. In laboratory work, the vessel is connected to a repeat pipette and used to suck liquid and to discharge metered liquid.

Whereas such syringelike sucking vessels can be used for various purposes, problems will arise when liquids are to be taken from a deep vessel, such as a relatively large bottle, because the syringe will reach the liquid in the bottle when the latter is full but will no longer dip into the liquid when a substantial amount of liquid has been taken.

From German Patent Specification No. 32 04 178 it is known to provide a pipetting device with a mechanism for retaining a detachably inserted syringe and with means for a convenient discharge of small metered amounts of liquid. But that known syringe also has only a relatively short discharge tip, which gives rise to the problems outlined hereinbefore.

For this reason the use of the repeat pipette and the pipetting device will give rise to problems when liquids are to be taken from supply vessels in laboratories.

The liquids to be taken may consist of organic and inorganic liquids, solvents, acids, alkalies and reagents, and may have to be handled in milliliter amounts.

That reference to amounts is not made in a restricting sense because amounts of different orders of magnitude may be handled if the dimensions are properly selected.

EPA No. 0 212 964 discloses a sampling tube, which is provided with a check valve and is adapted to be introduced into a vessel so that liquid can be taken when a suction force is applied to the top end of the tube. A valve fitting may be detachably fitted on the tube at its top end to communicate through a constricted passage with the interior of the tube and in a chamber formed with through openings contains a small valve member. But that valve member is not required to effect an absolutely tight seal because a liquid level is desired to be maintained in the tube by the surface tension of the liquids. For this reason the sampling tube can be used only to handle certain liquids.

That known device has the purpose to provide a simple device in which the valve which is fitted on the tube can be discarded after a single use whereas the tube, which in that device constitutes a separate part, can be washed out and re-used. That tube consists of glass and for that reason cannot readily be cut to length. Besides, that tube is used only to take a sample by the exertion of a suction force so that syringelike suction vessels cannot be used because there is an undefined empty space above the valve.

In view of the above remarks it may be desired in laboratories to suck equal amounts of liquid from supplies in which the liquid level changes as liquid is taken. So-called bottle dispensers are known, which constitute inserts of substantial size and are operated by pump systems and discharge into an open receiving vessel from which liquid can then be taken. In that case liquid is indirectly taken from a vessel and the transfer into the receiving vessel will involve a considerable occlusion of air and evaporation. The operation is complicated and the known dispensers are very expensive.

Other known devices comprises a handling or receiving vessel which can be compressed to directly discharge or to receive in a supply space a liquid in an amount which can hardly be accurately defined. The capacity of such receiving space may arbitrarily be changed by an additonal control device. This will not permit a taking of an accurate amount of liquid as is contemplated in connection with the present invention. For the purposes of the invention it is contemplated that syringelike sucking vessels known as pipettes will always be used.

SUMMARY OF THE INVENTION

For this reason it is an object of the invention to provide a process and a device which are of the kind described first hereinbefore and which permit a use of syringelike sucking vessels together with repeat pipettes or pipetting devices of the kind described hereinbefore and permit a handling of liquid under consistent suction conditions without a need for an expensive transfer into short receiving vessels, which transfer would give rise to problems particularly in the handling of aggressive substances.

To accomplish that object a process of the kind described first hereinbefore is carried out in accordance with the invention in such a manner that a metered stand-by volume of the liquid which is accessible from above is sucked simultaneously with the sucking of liquid through the short suction elements, a defined liquid sample is sucked off simultaneously with that sucking operation and the metered stand-by volume is maintained as a supply outside the deep vessel. At the beginning of the taking of liquid, two steps are performed. In one embodiment, only a bowl is provided and a stand-by volume may be formed in that an amount of liquid which has been sucked from the bowl first is fed back to the bowl. In another particularly desirable embodiment of the process, the metered stand-by volume of liquid is provided to have a defined depth, a first sucking operation is performed to suck a minimum amount consisting of at least part of the stand-by volume, and the stand-by volume having a defined depth is provided in the next sucking step. In another desirable embodiment the stand-by volume is provided with a defined depth of liquid and a defined liquid sample is sucked from the metered liquid volume.

The metered stand-by volume of liquid having a defined depth can be maintained in the same process step in which a sample is taken. Whereas a minimum amount consisting of a part of the stand-by volume is sucked, it is possible in a desirable embodiment to provide the stand-by volume of liquid having a defined depth even by the first sucking step.

If syringes are used which have a particularly small volume, the suction-assisting device may reliably be filled in that a syringe having a larger volume is used for the first sucking step.

In a preferred embodiment of the invention the exertion of a controlled suction force permits an establishment of two liquid surface levels in that a metered amount of liquid for the next sucking step is automatically sucked from the changing volume of liquid in the vessel in each sucking step in which a liquid sample is sucked from the stand-by volume of liquid. As a result, the operation of said apparatuses does not involve a considerable expenditure of work.

In that process, two consecutive results are produced in one process step. In a first stage the defined stand-by volume is provided from a changing volume of liquid by the sucking action of the syringelike sucking vessel. In a second stage a sample can reliably be taken even by a short syringe.

In a simple embodiment device of the kind described first hereinbefore is characterized in that the tube is attached to a bowl, which is adapted to be fitted on the deep vessel at its mouth, the tube depends from said bowl, and the tube has an open top end. In that case the stand-by volume is provided above the check valve and may extend as far as into the bowl. The bowl may constitute a support for the stand-by volume of liquid having a defined level in the preparation of the next sucking step.

The characterizing features reside in that a space provided over the check valve is adapted to hold a stand-by volume which exceeds the volume of the sample that is to be taken off, an entrance opening for the tip of a sample-taking vessel, which contains a piston, is provided above the check valve, and the syringe is adapted to be tightly inserted into the entrance opening.

It is apparent that the bowl is a simple part. In a particularly preferred embodiment the bowl is a portion of a housing, the open top end of the tube is disposed in said housing near its top, and the housing is adapted to hold a stand-by volume of liquid of defined depth in the space between the entrance opening and the check valve.

In such an embodiment comprising a housing the entrance opening for receiving the tip of a suction vessel provided with a piston is arranged in the top wall of the housing. This is a desirable feature providing an entrance opening as an abutment for the tip of the syringelike sucking vessel.

It is surprising that this results in a simple apparatus for performing in two stages for taking from an undefined volume a defined volume when the tip is immersed to a defined depth in a step which is performed at the same time as the taking of the sample. If only an open-topped bowl is used, that bowl may have a certain depth for holding the stand-by volume of liquid but a disadvantage resides in that the liquid has an exposed surface, from which liquid can evaporate, and that the stand-by volume of liquid may become soiled, which may be undesirable for certain liquids.

The use of a housing will afford the advantage that the deep vessel, particularly a bottle, and the stand-by volume of liquid will substantially be sealed and will be protected against evaporation and an ingress of foreign matter. An upper limit for the surface level of the stand-by volume of liquid is desirably defined in the top portion of the housing, above the bowl disposed at the bottom of the housing.

The check valve may be arranged at the lower end of the tube so that the contents of the tube is sealed at the bottom when the suction has been eliminated. But is is preferred to arrange the check valve in the top portion of the tube below its open top end. In that case the check valve will prevent a backflow from the holding space of the housing and an outflow from the tube will also be prevented because any ingress of air from above will be precluded. In that case the check valve will differ from that used in the embodiment described first hereinbefore because the check valve provides a tight seal and to that end may consist of a ball valve. It will be understood that the parts of the apparatus, particularly the valve, consist of a material which is resistant to the chemical attack of the substances which are to be handled.

In the first sucking step the liquid is to be sucked at least into a space above the check valve so that a supply of liquid is provided in said space. If the check valve is arranged in the tube hear its bottom end, the tube may substantially completely be filled in the first sucking step. If the check valve is arranged in the tube near its top, a tube section or a valve chamber disposed above the valve member is preferably filled with liquid in the first sucking step.

The arrangement of the valve near the top of the tube will afford the advantage that the tube may consist of a severable material so that the auxiliary sucking device may be adapted to the depth of the deep vessel or of a bottle.

The bowl or housing may be integral with the tube. In that case the device can be placed on a deep vessel, particularly on a bottle. From this aspect a desirable embodiment resides in that a tubular fitting extending in the direction of the center line of the bowl is provided in the bowllike bottom portion of the housing and is provided near its top end with the check valve and the tube is tightly fitted into said tubular fitting from its lower end. That embodiment will afford advantages particularly as regards the manufacture because an adaptable tube may be used. Seals may be provided by inwardly directed projections in the tubular fitting or a fit which ensures tightness may be provided between the tube and the tubular fitting. The interfitting parts may have a slight taper.

If a stand-by volume is provided which has a predetermined liquid surface level in each sucking step, a particularly preferred embodiment resides in that the entrance opening constitutes an abutment for the tip of the syringelike suction vessel so that the tip will be inserted to a defined depth, which ensures that the mouth of the tip is below the minimum surface level of the liquid. The mouth of the tip must be sufficiently spaced below the minimum liquid surface level so that the liquid will not subside below the mouth of the tip when the desired volume is sucked off.

Such an abutment may be designed in various ways. The entrance opening preferably has a conical shape which conforms to the conical tip of the syringelike suction vessel.

The syringelike sucking vessel preferably can suck a volume which is at least as large as the volume which can be held by the tube and is preferably as large as the stand-by volume of liquid. The desired operation can be performed if a minimum liquid surface level has been reached and the tip of a sucking vessel can be immersed to a sufficient depth below said minimum liquid surface level for the next sucking step.

In view of the above it will be understood that the sucking vessel is operable to suck a volume of liquid which is so large that a single stroke will be sufficient to provide at least part of the stand-by volume in view of the arrangement of the check valve in accordance with the above remarks. This will be significant if the large-volume vessel may have any desired depth so that the volume to be sucked in one step and that depth are not directly related to each other. Part of the stand-by volume of liquid is to be provided. A plurality of strokes may have to be performed by the sucking vessel for the taking of the first samples of liquid. This possibility is explicitly included.

The auxiliary sucking device provided in accordance with the invention, particularly for a long-time use in a laboratory, may desirably constitute also an evaporation barrier.

In that case the bowl or the bowllike bottom portion of the housing may preferably have conical wall portions for centering the bowl or housing on the mouth of the bottle and for sealing engagement with the periphery of the bottle.

In a preferred embodiment, a venting valve is disposed in the housing near its top. In that case the syringelike sucking vessel may be used and for the taking of the first samples a sufficient amount of liquid may be sucked by a plurality of piston strokes from a deep container which is filled only in its bottom portion. In that case it will not be necessary to remove the syringelike sucking vessel from the entrance opening after each stroke for a venting of the housing through the entrance opening.

In a preferred embodiment, the liquid in the deep vessel and the stand-by volume are sealed in that the entrance opening contains a seal which opens as the tip is inserted and which closes as the tip is removed. That seal may particularly consist of a membrane formed with a star-shaped array of slits.

Further desirable features will become apparent from the dependent claims.

DETAILED DESCRIPTION OF THE PREFERRED EMBODIMENTS

Figure 1:
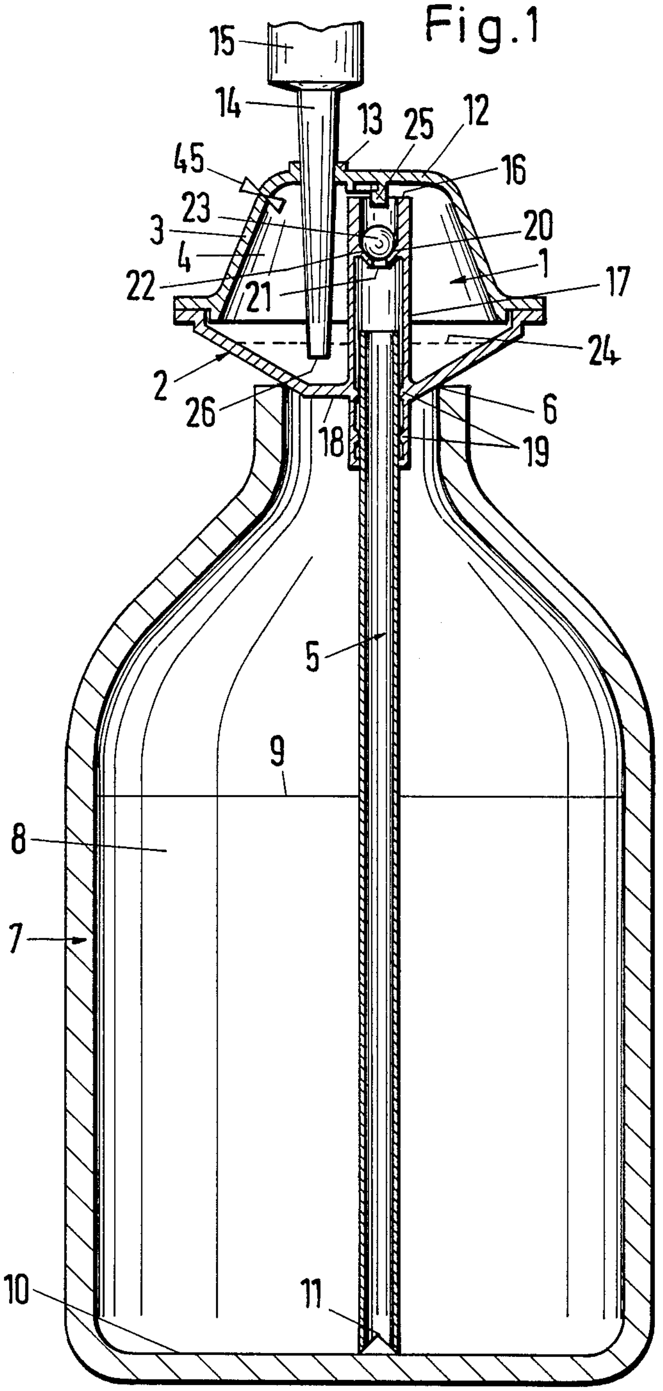
FIG. 1 is a vertical longitudinal sectional view showing a preferred embodiment associated with a bottlelike vessel.

The invention will be explaned hereinafter by a description of illustrative embodiments shown on the drawing.

The apparatus in accordance with the invention comprises a housing 1, which consists of a bowllike bottom portion 2 and of a domelike top portion 3, which is liquidtightly flanged to the bottom portion 2. Between the two housing portions 2 and 3 the housing contains a holding chamber 4. A tube 5 depends from the bowllike bottom portion 2 of the housing.

In accordance with FIG. 1 the bowl-like bottom portion 2 of the housing is placed on the rim 6 of the mouth of a bottle 7, which contains liquid 8 having a surface level 9, which subsides as liquid is taken.

The tube 5 extends as far as to the bottom of the bottle 7 and is formed in its periphery with angularly spaced apart slits, which extend upwardly from the lower end of the tube 5. Alternatively, the tube 5 may be so short that its lower end is slightly spaced above the bottom 10. That arrangement will permit liquid to be taken from the bottle 7 as long as there is liquid above the bottom 10.

The domelike top portion 3 of the housing 1 and particularly its top wall 12 is formed with an entrance opening 13, through which a conical tip of a syringelike sucking vessel 15 can be inserted into the housing. As has been outlined hereinbefore that sucking vessel 15 may be connected to a pipetting device or to a repeat pipette. The entrance opening 13 has a corresponding conical shape to form a hollow-conical surface for sealing the conical tip 14 so that the latter can not be inserted in excess of a defined depth.

The tube 5 may be integral with the bowllike bottom portion of the housing and communicates with a mouth 16 that is disposed below and close to the top wall 12. This is a preferred embodiment.

In the illustrated embodiment a tubular fitting 17 is formed in the bowllike bottom portion of the housing and extends upwardly to a level which is closely disposed below and closely spaced from the top wall 12. That fitting 17 is formed with the mouth 16. The tubular fitting depends from the bottom 18 of the housing and has inwardly directed sealing projections 19. The tube 5 is liquidtightly fitted in that tubular fitting 17 to a depth which can be selected within a wide range.

Under the mouth 16 at the top of the tubular fitting 17 the latter has an inwardly directed bowllike portion 20, which is upwardly concave and formed with a central through hole 21. The top surface of the bowllike portion constitutes a valve seat 22 for a spherical valve member 23, which will seal the interior of the tube 5 in response to a downwardly directed suction or pressure force. A floating of the valve member 23 from the mouth 16 is prevented by projection 25, which is provided on the top wall 12 of the housing and protrudes into the mouth 16. Instead of the projection 25, the top wall 12 may constitute a stop for the valve member 23 so that the latter will be held in the tubular fitting 17 above the valve seat 22.

At the beginning of a taking operation a vacuum sucking liquid is produced in the sucking vessel. As a result, the valve member is lifted from its seat and the liquid rises through the tube 5 into the bowllike bottom portion 2 at least to a level above the valve or valve member, e.g., to a level 24.

In dependence on the size of the sucking vessel the latter may initially be filled with air or may be filled with liquid entirely or in part after the first suction stroke. In the latter case the syringelike sucking vessel 15 may be removed from the liquid contained in the housing 1 and may be operated to discharge its liquid contents in controlled amounts. In the former case, the sucking vessel must be operated to perform at least one additional suction stroke and the preceding pressure stroke toward the housing will then ensure that the valve member 23 will remain on its seat so that the tube 5 remains filled. As a result, the liquid surface level 24 will be maintained once it has been reached. The resulting superatmospheric pressure in the holding chamber is relieved through a venting valve 45.

A venting valve will not be necessary when the tip 14 or the sucking vessel 15 is removed from the housing 1 after the first suction stroke and the piston is then returned to the tip.

The level 24 is so adapted to the length of the immersed portion of the syringe that the liquid surface level will not subside below the mouth of the tip as the sucking vessel is being filled. The level 24 is the minimum liquid surface level. A higher liquid surface level in a closed housing will be described with reference to FIG. 2.

In subsequent operations a controlled quantity is sucked from the stand-by volume of liquid in the holding chamber of the housing 1. The mouth 26 is immersed to such a depth that a sufficient amount of liquid can be sucked from the liquid that is contained in the bowllike bottom portion 2.

Figure 2:
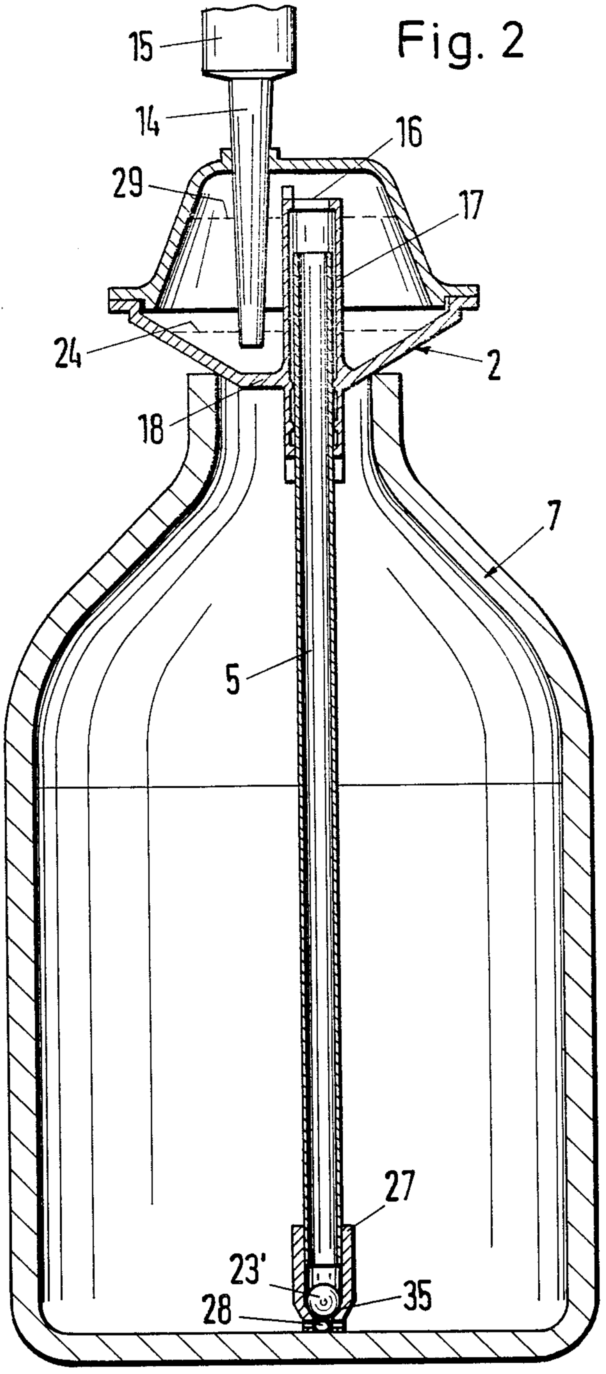
FIG. 2 is a view that is similar to FIG. 1 but shows a different embodiment.

FIG. 2 shows a similar embodiment and is provided with the same reference characters. In that embodiment the valve comprising the valve member 23' is disposed in the tube 5 near its bottom end. The valve member 23' is contained in a fitting 27, which is fitted on the bottom end of the tube 5 and which has lateral openings 28 through which liquid can enter. The fitting 27 may be removable so that in this embodiment the length of the tube 5 may also be adapted to the depth of the bottle 7. It will be understood that the fitting 27 may be formed with drawn-in portions, which constitute a valve seat for the valve member 23' above the openings 28 and sufficient space is provided in the fitting below the bottom end of the tube 5 to permit the valve member 23' to lift from the valve seat.

In this embodiment the tubular fitting 17 which is provided in the bowllike bottom portion 2 of the housing is closely fitted on the tube 5 and an adaptation to the depth of the bottle is permitted in that the tube 5 can be inserted into the fitting 17 to a selected depth.

The lower level 24 indicated in FIG. 2 is the minimum liquid surface level. An upper level 29 is indicated below the mouth 16 at the top end of the tube 5 so that the tip can always be immersed to a sufficiently large depth and in the embodiment shown in FIG. 2 can be used to suck virtually the entire liquid volume disposed between the levels 24 and 29. If the housing and particularly the bowllike lower portion of the housing is narrow, the conical stand-by volume of liquid shown in FIG. 2 will be obtained also in the embodiment of FIG. 1.

Figure 3:
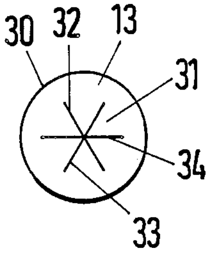
FIG. 3 is a diagrammatic top plan view showing entrance opening provided with a sealing element.

FIG. 3 is a top plan view showing the entrance opening 13, which has a flangelike rim 30 and is spanned by a membrane 31, which has slits 32, 33, 34 . . . , which extend from the center of the membrane 31 in a star-shaped configuration. When the tip 14 is forced against the membrane 31, the tip 14 will easily penetrate the membrane 31 and will tightly be sealed at its conical surface which is contacted by the membrane 31.

As the tip 14 is retracted, the elastic sectors of the membrane 31 between the slits 32 to 34 return to their initial position so that the entrance opening will substantially be closed and an evaporation of liquid will substantially be prevented. In the embodiment shown in FIG. 2 the valve seat 35 is constituted by a constricted portion of the fitting 27. FIG. 4 shows again the externally exposed bowl 40, which is open-topped. Alternatively, a housing as shown in FIG. 1 may be provided, which has a bowllike bottom portion 2. The tube 5 consists of one piece and as in the embodiment shown in FIG. 1 is provided near its top end with the valve that comprises a valve member 23.

Figure 4:
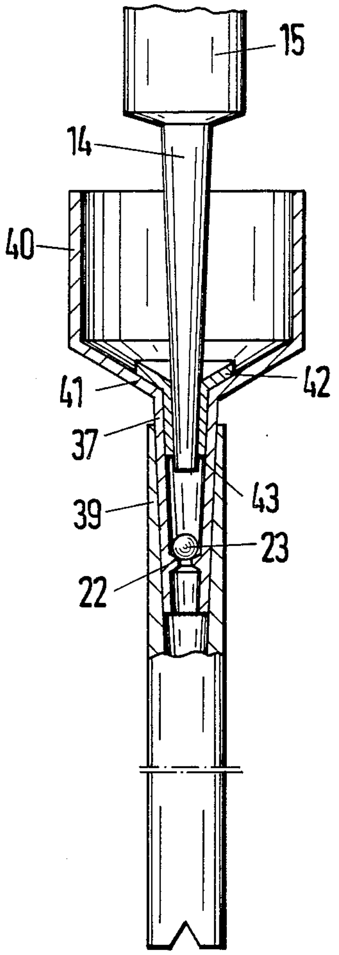
FIG. 4 is a vertical longitudinal sectional view showing a further embodiment.

FIG. 4 shows an open-topped bowl 40, from which the tube 5 depends. The bowl 40 has a conical wall portion 41 and a central through hole 37. A valve comprising a valve seat 22 and a spherical valve member 23 is disposed below the wall portion 41 and the through opening 37.

In the embodiment shown in FIG. 4 the bowl 40 is provided with a slightly conically tapered tubular fitting 39, which depends from the through opening 37 and contains the check valve 22, 23. The tube 5 is slidably and tightly fitted on that tubular fitting 39.

The bowl 40 contains an insert 42, which protrudes into the tubular fitting 39 and conforms to the adjacent wall portions. That insert constitutes a sealing seat for the tip 14 of a sucking vessel 15, which contains a piston.

The bottom rim 43 of the insert 42 constitutes an abutment or an element for limiting the rise of the valve member 23. The diameter of the valve member 23 exceeds the diameter of the flow area defined by the bottom rim 43.

That embodiment desirably comprises also an open-topped bowl 40 for holding a stand-by volume of liquid, which is lifted above the check valve by each suction stroke.

In use, liquid which has been sucked by the sucking vessel may be discharged into the bowl to provide a stand-by volume of liquid, into which the tip of the sucking vessel is immersed for the next suction stroke. This will ensure that liquid can be sucked without an ingress of air during a prolonged operation.

What is claimed is:

1. A process of taking liquid from a supply vessel by means of a sucking vessel which has a sucking element which is shorter than the supply vessel and through which liquid is sucked from a liquid supply of changing depth in the supply vessel, characterized by providing at least part of a defined stand-by volume of liquid in a space disposed outside said supply vessel and accessible from above by performing at least one sucking step to suck liquid from said supply vessel for providing in said space said stand-by volume of liquid in a defined depth, and to suck a controlled quantity of liquid as a liquid sample from said stand-by volume contained in said space.

2. A device for use in taking liquid from a supply vessel by means of a sucking vessel having a sucking element which is short relative to the depth of the supply vessel, which device comprises the sucking element formed as a tube, which is adapted to be introduced into the supply vessel, a check valve for closing the flow area of the tube against a flow to the bottom end of the tube in response to a pressure applied to said valve from the top end of the tube, and a bowl, which is adapted to be detachably mounted on said supply vessel, and which contains the top end of said tube provided with the check valve, wherein said bowl defines a space for holding a stand-by volume of liquid, which stand-by volume is larger than the volume of a liquid sample to be taken, above said check valve (22, 23) and an opening (13; 42, 43) is provided in said bowl above said check valve (22, 23), which opening is adapted to receive a tip (14) of a sample taking vessel (15) so that said tip (14) is adapted to be sealingly engaged in the opening (13; 42, 43).

3. A device according to claim 2, wherein the bowl (2) has a top wall (12) formed with said entrance opening (13), and adjacent to said top wall contains a mouth (16) adjacent to the top end of the tube (5), and between said entrance opening (13) and the check valve (22, 23) contains a space for holding the stand-by volume of liquid having a defined depth and said bowl (2) is provided in its top part with a venting valve (45).

4. A device according to claim 3, wherein a bottom portion of said bowl (2) contains a tubular fitting, which extends in the direction of the center line of the bowl (2) and which at its top end contains the check valve (22, 23) and which at its bottom end (17) contains in a sealingly fitted manner the tube which extends from the bottom end.

5. A device according to claim 3, wherein the entrance opening (13) constitutes an abutment for the tip (14) of the sample-taking vessel (15), which abutment defines for said tip (14) a predetermined depth of insertion so that when the tip (14) engages the abutment the mouth (26) extends into the bowl to such a depth below a minimum liquid surface level for the stand-by volume of liquid that a predetermined volume of liquid can be sucked from said stand-by volume of liquid.

6. A device according to claim 5, characterized in that the entrance opening (13) is conical and conforms to the conical tip (14) of the sample-taking vessel.

7. A device according to claim 3, wherein a sealing member is contained in the entrance opening (13) and is arranged to open in response to an insertion of the tip and to close in response to a retraction of the tip and particularly consists of a membrane (31), which has slits (32 to 34) in a starlike array.

8. A device according to claim 2, characterized in that the sample-taking vessel (15) contains a space and is operable to suck into said space a volume which is at least as large as the volume of liquid which is adapted to be held by the tube (5) and is at least as large as said stand-by volume of liquid.

9. A device according to claim 2, characterized in that the check valve (22, 23) is disposed adjacent to and below the mouth (16) provided adjacent to the top end of the tube (5).

* * * * *